United States Patent
Davis et al.

(10) Patent No.: US 9,255,482 B2
(45) Date of Patent: Feb. 9, 2016

(54) ELECTRICAL WIRING SYSTEM FOR A ROTOR HUB

(71) Applicant: Bell Helicopter Textron Inc., Fort Worth, TX (US)

(72) Inventors: Hunter J. Davis, Arlington, TX (US); Paul B. Sherrill, Grapevine, TX (US); Robert A. Self, Euless, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 443 days.

(21) Appl. No.: 13/862,515

(22) Filed: Apr. 15, 2013

(65) Prior Publication Data
US 2013/0287571 A1 Oct. 31, 2013

Related U.S. Application Data

(60) Provisional application No. 61/638,068, filed on Apr. 25, 2012.

(51) Int. Cl.
*B64C 27/50* (2006.01)
*B64C 27/00* (2006.01)
(Continued)

(52) U.S. Cl.
CPC .............. *F01D 5/147* (2013.01); *B64C 27/473* (2013.01); *B64C 27/48* (2013.01)

(58) Field of Classification Search
CPC ......... F01D 5/147; B64C 27/48; B64C 27/50; B64C 27/51; B64C 27/43; B64C 27/473; B64D 15/12; B64D 2700/62052; B64D 2700/51149

USPC ........ 416/146 R, 141–431; 244/17.11, 17.19, 244/6, 7 A, 228, 232–233
See application file for complete search history.

(56) References Cited

U.S. PATENT DOCUMENTS 2,437,330 A * 3/1948 Mullgardt ........... B64C 29/0033
244/48
2,454,874 A * 11/1948 Hunter ................... B64D 15/12
244/134 D (Continued)

FOREIGN PATENT DOCUMENTS

CN  101746502 A  4/2012
DE  19748716 C1  11/1998

(Continued)

OTHER PUBLICATIONS

European Intention to Grant 71(3) in related European Application No. 13164899.0, dated Oct. 21, 2014, 21 pages.

(Continued)

*Primary Examiner* — Thai Ba Trieu
(74) *Attorney, Agent, or Firm* — Noah A. Tevis

(57) ABSTRACT

The electrical harness system is configured for routing a harness between a rotor yoke and a rotor blade. A recess in an inboard cap member is configured to house a connector and an associated harness. As the recess extends along a radial path in the chordwise direction of the rotor blade, the harness is configured to lie within the recess. Operationally induced centrifugal forces promote positioning the slack of harness within the recess, while the slack in the harness remains available for relative dynamic movements between the rotor blade and the rotor yoke. Such a routing of the harness reduces aerodynamic drag and minimizes damage that could otherwise occur to the harness.

16 Claims, 5 Drawing Sheets

(51) Int. Cl.
  *F01D 5/14* (2006.01)
  *B64C 27/473* (2006.01)
  *B64C 27/48* (2006.01)

(56) References Cited

U.S. PATENT DOCUMENTS

| | | | | |
|---|---|---|---|---|
| 2,629,567 A * | 2/1953 | Papadakos | | B64C 13/30 244/17.13 |
| 2,704,128 A * | 3/1955 | Papadakos | | B64C 13/30 244/17.21 |
| 3,042,346 A | 7/1962 | Hawley | | B64D 15/12 244/134 R |
| 3,106,369 A * | 10/1963 | Borst | | B64C 9/38 244/7 R |
| 4,946,354 A * | 8/1990 | Aubry | | B64C 27/54 416/158 |
| 5,020,741 A * | 6/1991 | Ziegler | | B64D 15/12 244/134 D |
| 5,304,036 A * | 4/1994 | Groen | | B64C 27/43 416/102 |
| 5,322,415 A * | 6/1994 | White | | B64C 27/50 416/143 |
| 5,628,620 A * | 5/1997 | Arlton | | A63H 27/12 416/114 |
| 5,782,606 A * | 7/1998 | Mondet | | B64C 27/50 416/143 |
| 5,951,251 A * | 9/1999 | Mondet | | B64C 27/322 416/140 |
| 6,032,899 A * | 3/2000 | Mondet | | B64C 27/50 416/143 |
| 6,036,442 A * | 3/2000 | Certain | | B64C 27/50 416/143 |
| 6,358,006 B1 * | 3/2002 | Weyandt | | B64D 15/12 416/39 |
| 6,447,249 B2 * | 9/2002 | Potdevin | | B64C 27/50 416/143 |
| 6,481,965 B2 * | 11/2002 | Certain | | B64C 27/50 416/143 |
| 6,485,261 B2 * | 11/2002 | Mondet | | B64C 27/50 416/143 |
| 6,695,253 B1 * | 2/2004 | Romani | | B64C 27/50 416/142 |
| 6,715,711 B1 * | 4/2004 | Muylaert | | B64C 27/82 244/17.19 |
| 6,752,596 B2 * | 6/2004 | Mondet | | B64D 15/12 416/143 |
| 6,783,327 B1 * | 8/2004 | Davis | | B64C 27/50 416/143 |
| 7,798,442 B2 * | 9/2010 | Miner | | B64C 27/50 416/143 |
| 2001/0051096 A1 | 12/2001 | Potdevin | | |
| 2002/0081202 A1 * | 6/2002 | Certain | | B64C 27/50 416/143 |
| 2006/0049302 A1 | 3/2006 | Kennedy et al. | | |
| 2009/0180882 A1 * | 7/2009 | Stille | | B64C 27/51 416/140 |
| 2013/0189098 A1 * | 7/2013 | Covington | | B64C 27/51 416/1 |
| 2013/0216382 A1 * | 8/2013 | Wiinikka | | B64C 27/605 416/131 |
| 2014/0024251 A1 * | 1/2014 | Gaffiero | | B64D 15/12 439/527 |

FOREIGN PATENT DOCUMENTS

DE 19922153 A1 11/2000
DE 102009010502 A1 9/2010

OTHER PUBLICATIONS

Canadian Office Action in related Canadian Application No. 2,813,886, dated Oct. 27, 2014, 2 pages.
European Search Report in related European Application No. 13164899.0, dated May 27, 2013, 6 pages.
Chinese Office Action in related Chinese Application No. 201310148569.8, dated Jan. 30, 2015, 9 pages.
Chinese Office Action in related Chinese Application No. 201310148569.8, dated Oct. 27, 2015, 4 pages.

* cited by examiner

ELECTRICAL WIRING SYSTEM FOR A ROTOR HUB

BACKGROUND

1. Technical Field

The present application relates in general to an electrical wiring system for a rotor hub.

2. Description of Related Art

Certain aircraft include systems associated with a rotating airfoil, such as a rotor blade, that can require electrical power. For example, a rotor blade de-ice system can require electrical power. Conventionally, power is routed to the rotor blade with exposed brackets on the leading edge of the blade to mount an electrical connector. Such a configuration typically causes the bracket to extend out of the rotor blade contour and leaving the wiring harness exposed beyond the profile of the rotor hub. Part of the wiring harness is loose and must be handled carefully during manufacturing and when disconnected from the aircraft. Such a harness configuration increases the rotor hub drag and the vulnerability of the connector to foreign object damage (FOD). Such a configuration can further cause the harness to have a substantial loop in order to carry all the flap, lead/lag, and pitch motions while the centrifugal forces tend to pull the harness outward.

There is a need for an improved wiring system between the rotor hub and the rotor blade.

DESCRIPTION OF THE DRAWINGS

The novel features believed characteristic of the system of the present disclosure are set forth in the appended claims. However, the system itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
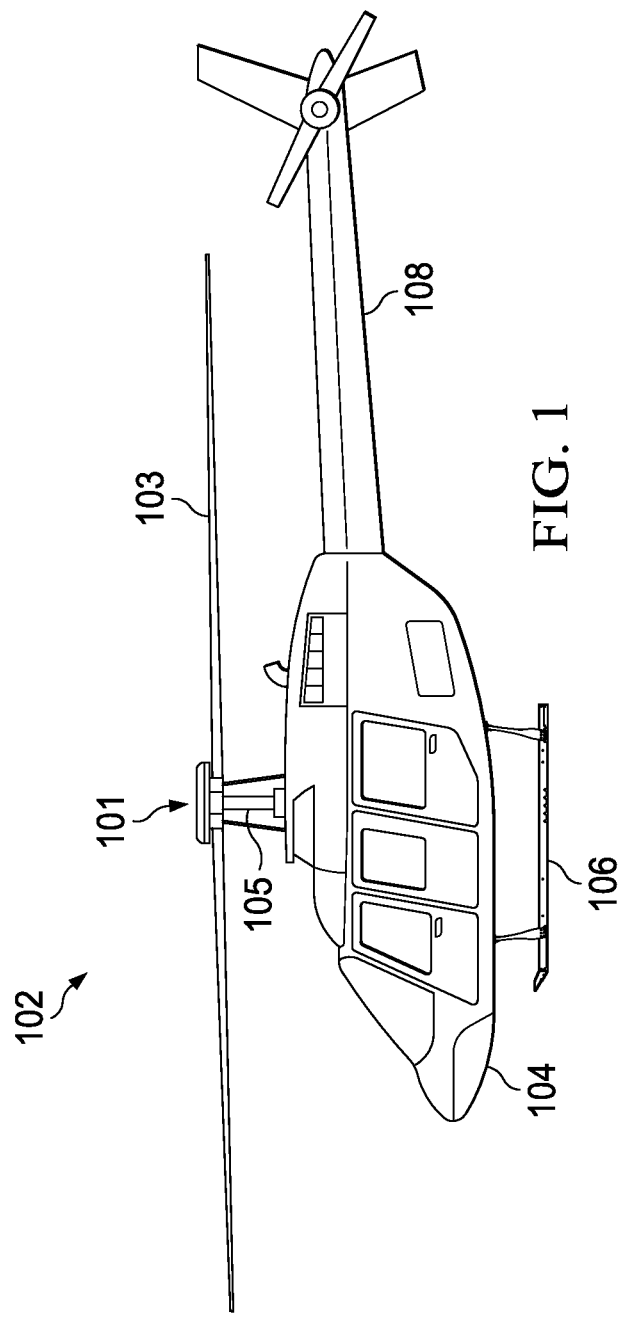
FIG. 1 is a side view of a rotorcraft, according to an embodiment of the present application.

Referring to FIG. 1 in the drawings, a rotorcraft 102 is illustrated. Rotorcraft 102 has a rotor system 101 with a plurality of rotor blades 103. Rotorcraft 102 further includes a fuselage 104, landing gear 106, and an empennage 108. A main rotor control system can be used to selectively control the pitch of each rotor blade 103 in order to selectively control direction, thrust, and lift of rotorcraft 102. It should be appreciated that even though the system of the present application is depicted on a rotorcraft 102 having certain illustrated features, it should be appreciated that the system of the present application can be implemented on other aircraft and aircraft configurations, as one of ordinary skill in the art would fully appreciate having the benefit of this disclosure.

Figure 2:
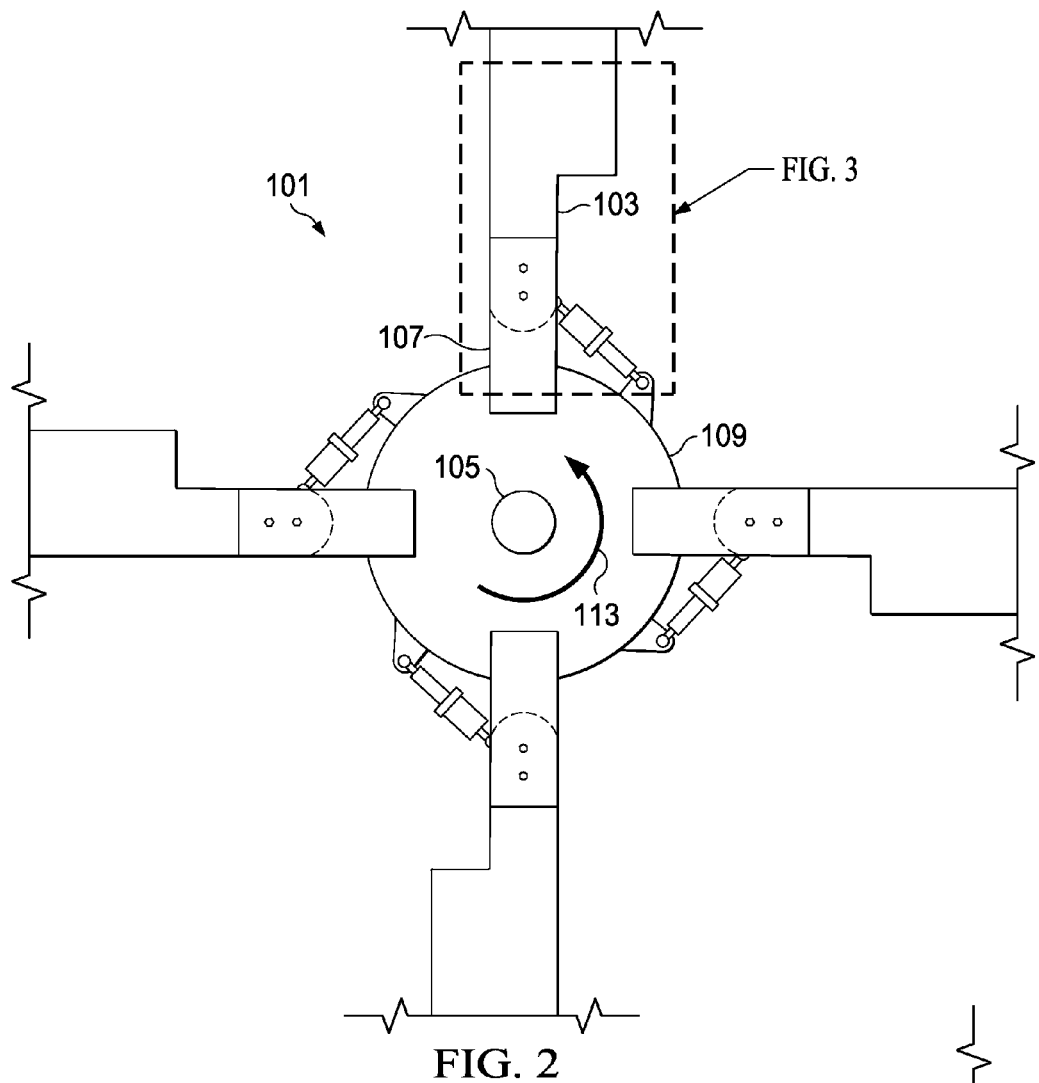
FIG. 2 is a view looking down on the rotor hub portion, according to an embodiment of the present application.
Figure 4:
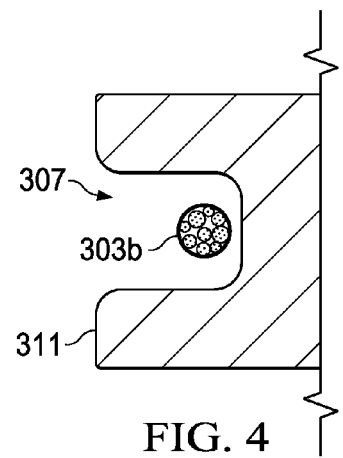
FIG. 4 is a cross-sectional view taken at section lines IV-IV in FIG. 3, according to an embodiment of the present application.
Figure 3:
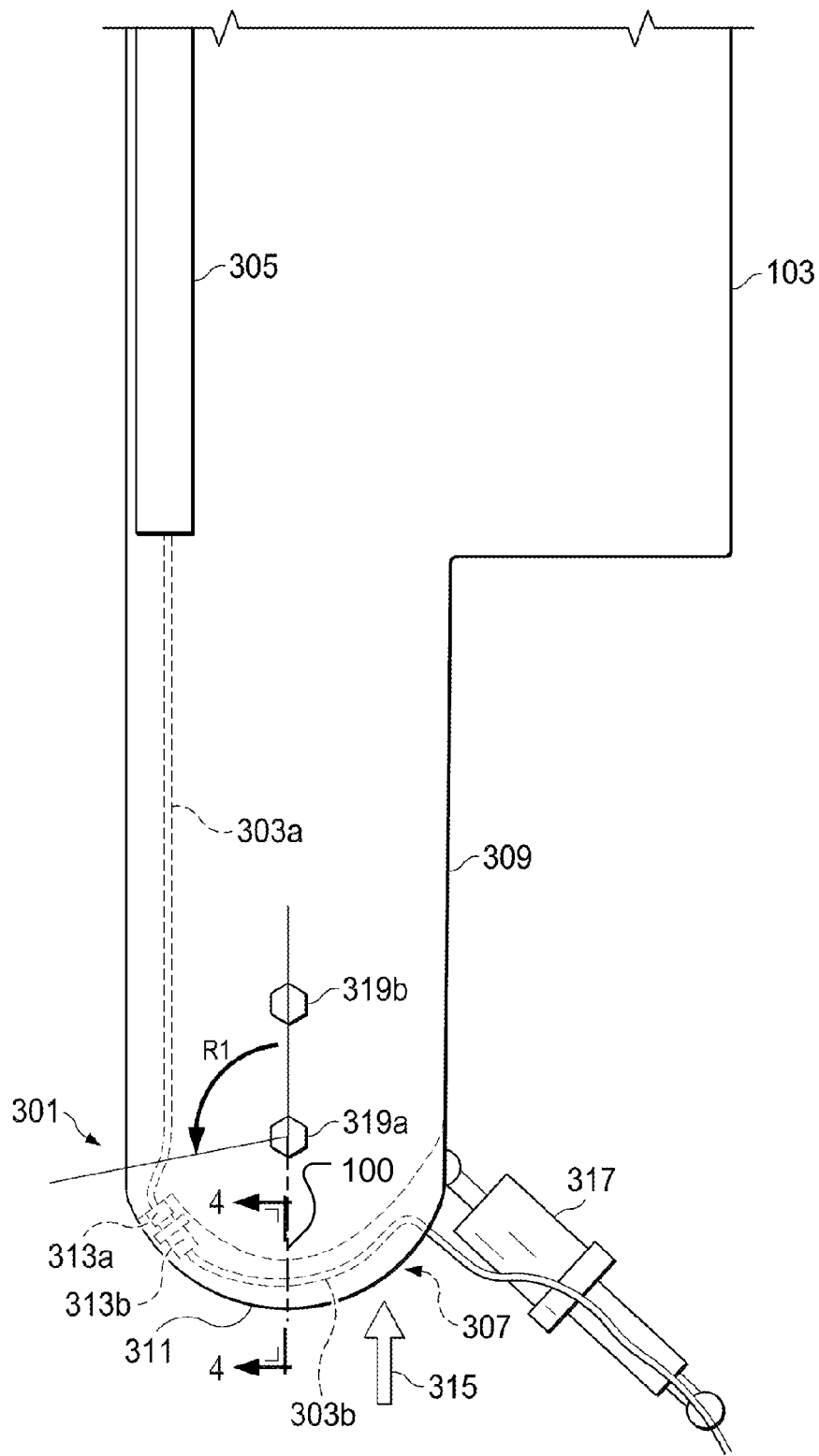
FIG. 3 is a detail view of the rotor hub portion, according to an embodiment of the present application.
Figure 5:
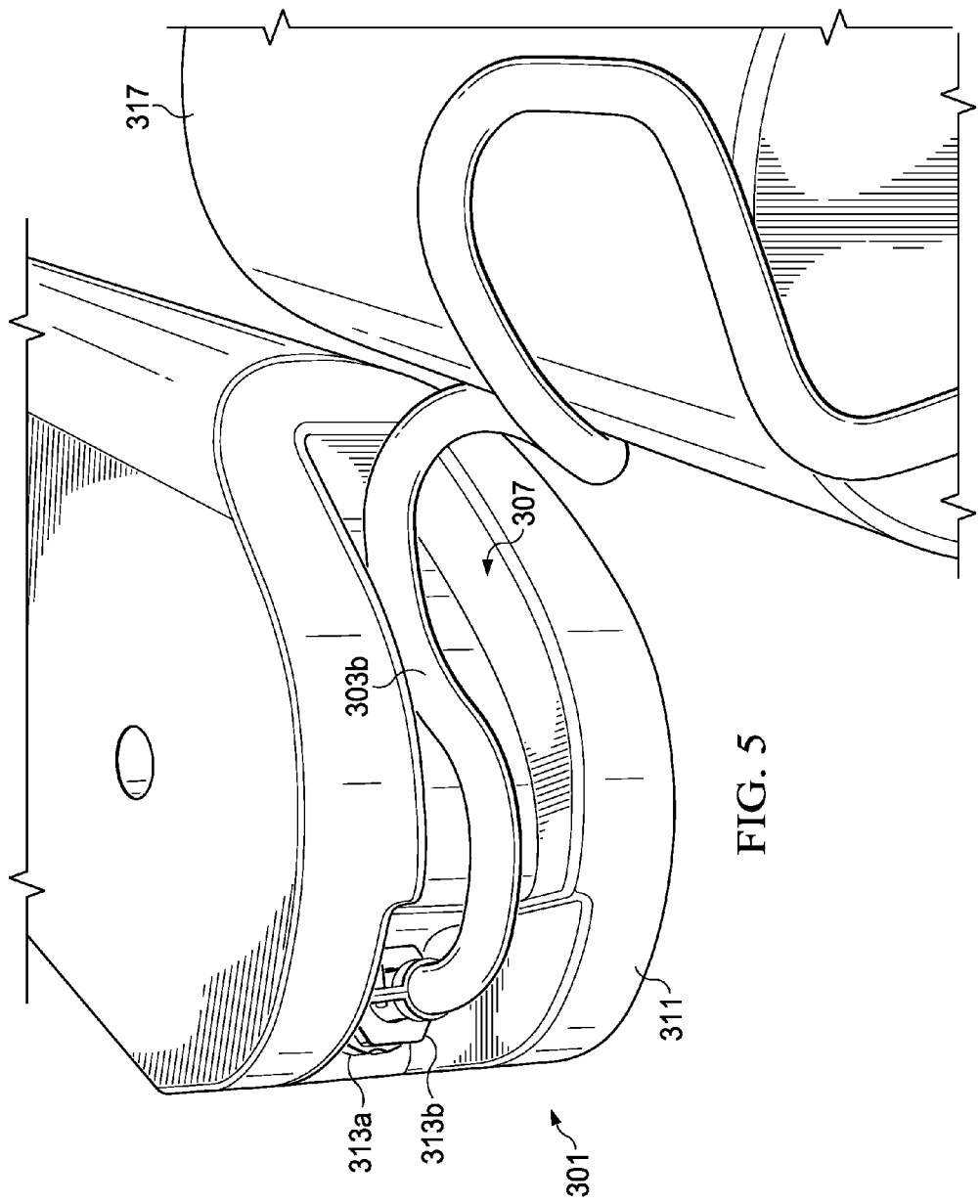
FIG. 5 is a perspective view of the wiring system, according to an embodiment of the present application.
Figure 6:
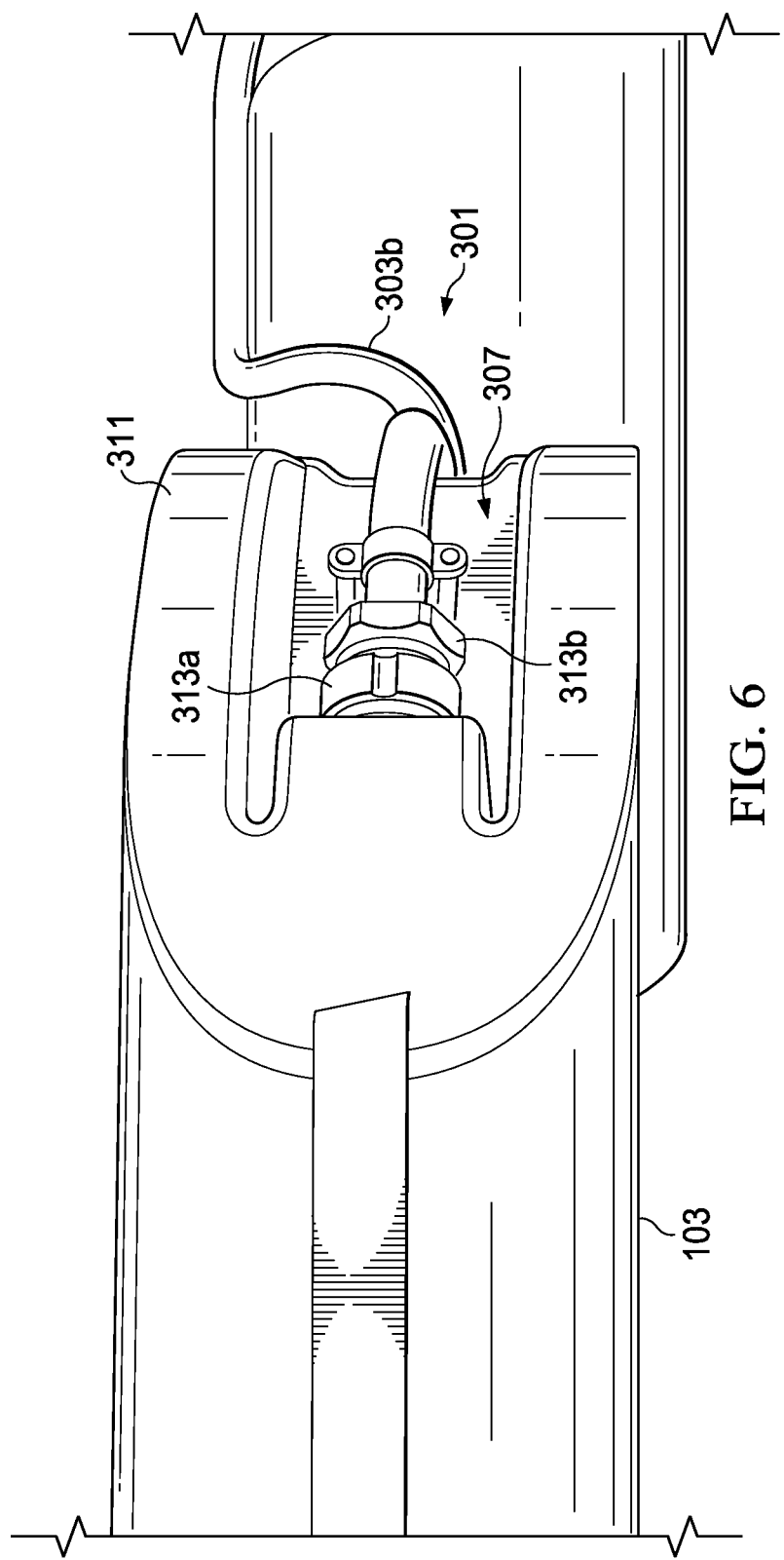
FIG. 6 is a perspective view of the wiring system, according to an embodiment of the present application.

Referring to FIG. 2, rotor hub 101 includes a plurality of rotor blades 103 coupled to a central yoke 109, via a rotor grip 107. Yoke 109 is coupled to a rotor mast 105 such that rotation of rotor mast 105, in a direction 113, causes the yoke 109 and rotor blades 103 to rotate about the rotor mast axis of rotation. It should be appreciated that even though rotor hub 101 is illustrated with four rotor blades 103, the system of the present application is equally applicable to rotor hubs having an alternative number of rotor blades 103.

Referring now also to FIGS. 3-6, an electrical wiring system 301 is illustrated. System 301 is configured for the routing of electrical lines in a dynamic environment. In the illustrated embodiment, system 301 includes a wiring harness 303a routed between a powered unit 305 and a connector 313a. System 301 further includes a connector 313b and wiring harness 303b. One feature of system 301 is a contoured recess 307 in a cap member 311 located at the root end of spar 309. In the illustrated embodiment, spar 309 is a partially hollow member; however, cap member 311 functions in part to seal off the interior portion of spar 309. Connectors 313a and 313b allows the wiring harness 303a to be routed in the interior of rotor blade 103 to powered unit 305, thus protecting harness 303a from damage. In the illustrated embodiment, powered unit 305 is a de-icing heater blanket; however, it should be appreciated that powered unit 305 can be any power consuming device, such as a light, an actuator for a moveable airfoil, or a vibration reduction system, to name a few examples. Further, harnesses 303a and 303b can alternatively be hydraulic hoses instead of power wire harnesses. Further, harnesses 303a and 303b can provide a data or control signal in addition or in lieu of providing power. For example, harnesses 303a and 303b can provide hydraulic power to a hydraulic actuator in rotor blade 103.

Harness 303b can be secured with one or more harness clips located within recess 307. Recess 307 forms a contoured radius along the chordwise direction at the root end portion of cap member 311. Recess 307 and harness 303b are configured such that an operationally generated centrifugal force 315 acts to position a slack portion of harness 303b into the trailing edge side of recess 307. A slack portion of harness 303b can be necessary to compensate for all the flap, lead/lag, and pitch motions of rotor blade 103. In the illustrated embodiment, the harness 303b is routed away from the body of the rotor blade 103 toward a lead/lag damper 317; however, it should be appreciated that an alternative embodiment may not include lead/lag damper 317. Harness 303b is routed along the axis of lead/lag damper 317, and further extends back towards the axis of rotation. A loop or slack in the harness 303b can be implemented where the lead/lag damper 317 joins yoke 109, allowing for relative motion therebetween.

System 301 is configured to minimize aerodynamic drag penalties that may otherwise be associated with conventional harness routing. Further, system 301 allows connectors 313a and 313b, and its terminals, to be enclosed in recess 307 of blade 103, away from potential environmental damage. Further, potential manufacturing damage to harness 303a is reduced by reducing the exposed amount of harness 303a. Further, coupling harness 303b to the blade portion harness 303a at connectors 313a and 313b reduces damage to may otherwise occur to conventional wire attachments that are susceptible to fatigue induced breakage. Connector 313a is mounted on a wall 321 near a leading edge portion of recess 307. Wall 321 can be a flat surface suitable for mounting connector 313a. In the illustrated embodiment, wall 321 is approximately normal to an inner surface of recess 307 such that the harness 303b is directed inboard toward the rotor mast until approximately reaching a centerline 100 of the root end, in which recess 307 is contoured in an outboard direction until reaching the trailing edge termination. This trailing edge portion of recess 307 provides a secure housing for the slack portion of harness 303b as centrifugal forces acts upon harness 303b.

In the illustrated embodiment, rotor blade 103 is coupled to rotor grip 107 with bolts 319a and 319b. It can be particularly desirable to fold and stow rotor blades 103. System 301 is configured to allow folding of rotor blade 103 without having to disconnect connectors 313a and 313b from each other. For example, bolt 319b can be removed such that rotor blade 103 is allowed to rotate about bolt 319a in a rotation R1. In such a configuration, when rotor blade 103 is rotated towards its leading edge, slack in harness 303b is generated and allowed to build within recess 307. Such a configuration of system 301 saves time and maintenance costs associated with disconnecting a harness for rotor blade folding.

The particular embodiments disclosed herein are illustrative only, as the system may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A rotor blade, comprising:
   an airfoil shaped body;
   a root end portion that is inboard from the airfoil shaped body;
   a cap member at the root end portion, the cap member having a recessed portion; and
   a first connector member coupled to a wall within the recessed portion;
     wherein the recessed portion is configured to house a harness coupled to a second connector member, the second connector member configured for mating to the first connector member.

2. The rotor blade according to claim 1, wherein the first connector member is located toward a leading edge portion of the recessed portion.

3. The rotor blade according to claim 1, wherein the wall has a surface that is approximately normal to an adjacent inner surface of the recessed portion.

4. The rotor blade according to claim 1, wherein the first connector member has a threaded portion configured for receiving a second connector member.

5. The rotor blade according to claim 1, wherein the first connector member is an electrical power connector for providing electrical power to a system in the rotor blade.

6. The rotor blade according to claim 1, wherein the first connector member is an electrical signal connector.

7. The rotor blade according to claim 1, wherein the first connector member is a hydraulic connector.

8. The rotor blade according to claim 1, wherein a leading edge portion of the recessed portion is located further toward a tip end of the rotor blade as compared to a portion of the recessed portion at a centerline of the root end.

9. The rotor blade according to claim 1, wherein a trailing edge portion of the recessed portion is located further toward a tip end of the rotor blade as compared to a portion of the recessed portion at a centerline of the root end.

10. A rotor blade, comprising:
    an airfoil shaped body;
    a root end portion that is inboard from the airfoil shaped body;
    a cap member at the root end portion, the cap member having a recessed portion; and
    a connector member coupled to a wall within the recessed portion;
      wherein a trailing edge portion of the recessed portion provides a housing for a slack portion of a harness coupled to the connector member;
      wherein the trailing edge portion of the recessed portion is located further toward a tip end of the rotor blade as compared to a portion of the recessed portion at a centerline of the root end.

11. The rotor blade according to claim 10, wherein operational centrifugal forces act to press the slack portion of the harness into the recessed portion.

12. A rotor hub for an aircraft, the rotor hub, comprising:
    a rotor mast;
    a yoke coupled to the rotor mast;
    a rotor blade coupled to the yoke, the rotor blade having a recessed portion at a root end portion;
    a first connector mounted to a wall of the recessed portion;
    a damper coupled between the rotor blade and the yoke; and
    a harness coupled to a second connector, the second connector mountable to the first connector;

wherein the harness is routed between the damper and the first connector along the recessed portion; and wherein the harness extends between the first connector and the yoke.

13. The rotor hub according to claim 12, wherein a leading edge portion of the recessed portion is located further toward a tip end of the rotor blade as compared to a portion of the recessed portion at a centerline of the root end.

14. The rotor hub according to claim 12, wherein a trailing edge portion of the recessed portion is located further toward a tip end of the rotor blade as compared to a portion of the recessed portion at a centerline of the root end.

15. A rotor hub for an aircraft, the rotor hub, comprising:

a rotor mast;

a yoke coupled to the rotor mast;

a rotor blade coupled to the yoke, the rotor blade having a recessed portion at a root end portion;

a first connector mounted to a wall of the recessed portion; and a harness coupled to a second connector, the second connector mountable to the first connector;

wherein the recessed portion is configured to house the harness coupled to a second connector member, the second connector member configured for mating to the first connector member.

16. A rotor hub for an aircraft, the rotor hub, comprising:

a rotor mast;

a yoke coupled to the rotor mast;

a rotor blade coupled to the yoke, the rotor blade having a recessed portion at a root end portion; and a first connector mounted to a wall of the recessed portion;

a harness coupled to a second connector, the second connector mountable to the first connector;

wherein a trailing edge portion of the recessed portion provides a housing for a slack portion of the harness as operational centrifugal forces act to press the slack portion of the harness into the recessed portion.

* * * * *